US012272295B2

(12) United States Patent
Cong et al.

(10) Patent No.: US 12,272,295 B2
(45) Date of Patent: Apr. 8, 2025

(54) PIXEL CIRCUIT FOR CONTROLLING LIGHT-EMITTING DURATION OF LIGHT EMITTING ELEMENT AND METHOD FOR DRIVING SAME, DISPLAY SUBSTRATE, AND DISPLAY APPARATUS

(71) Applicants: Beijing BOE Display Technology Co., Ltd., Beijing (CN); BOE Technology Group Co., Ltd., Beijing (CN)

(72) Inventors: Ning Cong, Beijing (CN); Minghua Xuan, Beijing (CN); Can Zhang, Beijing (CN); Xiaochuan Chen, Beijing (CN); Lijun Yuan, Beijing (CN); Qi Qi, Beijing (CN); Can Wang, Beijing (CN); Jinfei Niu, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/768,126

(22) PCT Filed: Jun. 8, 2021

(86) PCT No.: PCT/CN2021/099015

§ 371 (c)(1),
(2) Date: Apr. 11, 2022

(87) PCT Pub. No.: WO2022/022081

PCT Pub. Date: Feb. 3, 2022

(65) Prior Publication Data

US 2024/0296780 A1 Sep. 5, 2024

(30) Foreign Application Priority Data

Jul. 30, 2020 (CN) ........................ 202010748536.7

(51) Int. Cl.
*G09G 3/32* (2016.01)

(52) U.S. Cl.
CPC ....... *G09G 3/32* (2013.01); *G09G 2300/0842* (2013.01); *G09G 2310/0267* (2013.01);
(Continued)

(58) Field of Classification Search
CPC ........................................................ G09G 3/32
See application file for complete search history.

(56) References Cited

U.S. PATENT DOCUMENTS

2020/0286425 A1 9/2020 Lai et al.
2021/0225261 A1 7/2021 Xuan et al.
(Continued)

FOREIGN PATENT DOCUMENTS

CN 207867875 U 9/2018
CN 110021264 A 7/2019
(Continued)

OTHER PUBLICATIONS

Lai et al. CN 111145686 A—machine translation (Year: 2024).*

*Primary Examiner* — Gustavo Polo
(74) *Attorney, Agent, or Firm* — IPro, PLLC

(57) ABSTRACT

Provided is a pixel circuit. The pixel circuit includes a data writing circuit, a light-emission adjusting circuit, a light-emission control circuit, and a light-emission driving circuit; wherein the data writing circuit is coupled to a gate signal terminal, a first data signal terminal and a first node; the light-emission adjusting circuit is coupled to a target signal terminal, the first node and a second node; the light-emission control circuit is coupled to the second node, a reference signal terminal, a light-emission control signal terminal and a third node; the light-emission driving circuit is coupled to the third node, the gate signal terminal, a first power supply terminal, a second data signal terminal and a light-emitting element.

19 Claims, 7 Drawing Sheets

(52) U.S. Cl.
CPC ... *G09G 2310/061* (2013.01); *G09G 2310/08* (2013.01); *G09G 2320/0233* (2013.01)

(56) References Cited

U.S. PATENT DOCUMENTS

| | | | | |
|---|---|---|---|---|
| 2021/0407376 | A1 | 12/2021 | Yue et al. | |
| 2022/0139322 | A1* | 5/2022 | Wang | G09G 3/3241 345/690 |

FOREIGN PATENT DOCUMENTS

| | | | |
|---|---|---|---|
| CN | 110972503 | A | 4/2020 |
| CN | 111145686 | A | 5/2020 |
| CN | 111223443 | A | 6/2020 |

* cited by examiner

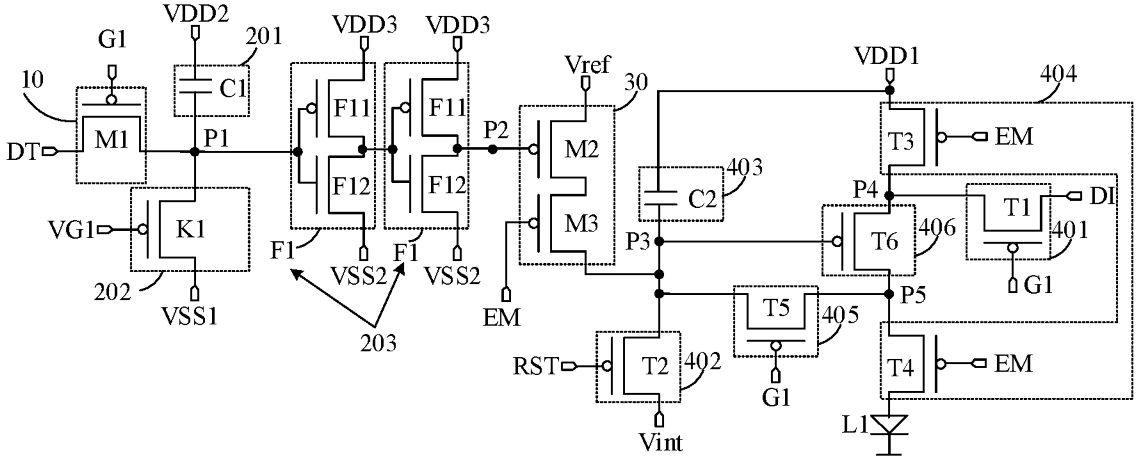

FIG. 5

601: In a data writing stage in which the potential of a gate driving signal provided by a gate signal terminal is a first potential, a data writing circuit outputs a first data signal provided by a first data signal terminal to a first node in response to the gate driving signal, and a light-emission adjusting circuit stores a potential of the first node.

↓

602: In a light-emitting stage in which the potential of a target signal provided by a target signal terminal and the potential of a light-emission control signal provided by a light-emission control signal terminal are both the first potential, the light-emission adjusting circuit adjusts the potential of the first node in response to the target signal, and adjusts the potential of a second node based on the potential of the first node; a light-emission control circuit outputs a reference signal provided by a reference signal terminal to a third node in response to the potential of the second node and the light-emission control signal; and a light-emission driving circuit outputs a driving signal to a light-emitting element in response to a potential of the third node, the first data signal and a first power supply signal provided by a first power supply terminal

FIG. 6

PIXEL CIRCUIT FOR CONTROLLING LIGHT-EMITTING DURATION OF LIGHT EMITTING ELEMENT AND METHOD FOR DRIVING SAME, DISPLAY SUBSTRATE, AND DISPLAY APPARATUS

CROSS-REFERENCE TO RELATED APPLICATION

The present disclosure is a US national stage of international application No. PCT/CN2021/099015, filed on Jun. 8, 2021, which claims priority to Chinese Patent Application No. 202010748536.7, filed on Jul. 30, 2020 and entitled "PIXEL CIRCUIT AND METHOD FOR DRIVING SAME, DISPLAY SUBSTRATE, AND DISPLAY APPARATUS," the contents of which are incorporated herein by reference in their entireties.

TECHNICAL FIELD

The present disclosure relates to the field of display technologies, and in particular, relates to a pixel circuit and a method for driving the same, a display substrate, and a display apparatus.

BACKGROUND

Micro light-emitting diodes (micro LEDs) are widely used in various display apparatuses due to the advantages of high luminance, high light-emitting efficiency, small size, low power consumption and the like.

In the related art, a pixel circuit driving the micro LED to emit light generally only includes: a light-emission driving circuit formed of a switching transistor and a driving transistor. The switching transistor may output a data signal provided by a data signal terminal to the driving transistor, and the driving transistor may output a driving signal to the connected micro LED based on the data signal to drive the micro LED to emit light.

SUMMARY

Embodiments of the present disclosure provide a pixel circuit and a method for driving the same, a display substrate, and a display apparatus. The technical solutions are as follows.

In an aspect, a pixel circuit is provided. The pixel circuit includes: a data writing circuit, a light-emission adjusting circuit, a light-emission control circuit, and a light-emission driving circuit; wherein the data writing circuit is coupled to a gate signal terminal, a first data signal terminal and a first node, and the data writing circuit is configured to output a first data signal provided by the first data signal terminal to the first node in response to a gate driving signal provided by the gate signal terminal;

the light-emission adjusting circuit is coupled to a target signal terminal, the first node and a second node, and the light-emission adjusting circuit is configured to store a potential of the first node, adjust the potential of the first node in response to a target signal provided by the target signal terminal, and adjust a potential of the second node based on the potential of the first node;

the light-emission control circuit is coupled to the second node, a reference signal terminal, a light-emission control signal terminal and a third node, and the light-emission control circuit is configured to output a reference signal provided by the reference signal terminal to the third node in response to the potential of the second node and a light-emission control signal provided by the light-emission control signal terminal; and the light-emission driving circuit is coupled to the third node, the gate signal terminal, a first power supply terminal, a second data signal terminal and a light-emitting element, and the light-emission driving circuit is configured to output a driving signal to the light-emitting element in response to the gate driving signal, a potential of the third node, a first power supply signal provided by the first power supply terminal and a second data signal provided by the second data signal terminal.

Optionally, the light-emission adjusting circuit includes: a first storage sub-circuit, an adjusting sub-circuit and a shaping sub-circuit; wherein the first storage sub-circuit is coupled to a second power supply terminal and the first node, and the first storage sub-circuit is configured to store the potential of the first node under control of a second power supply signal provided by the second power supply terminal;

the adjusting sub-circuit is coupled to the target signal terminal, the first node and a third power supply terminal, and the adjusting sub-circuit is configured to adjust the potential of the first node in response to the target signal and a third power supply signal provided by the third power supply terminal; and the shaping sub-circuit is coupled to the first node and the second node, and the shaping sub-circuit is configured to adjust the potential of the second node based on the potential of the first node.

Optionally, the target signal terminal is the light-emission control signal terminal; and the adjusting sub-circuit includes a switching transistor and a resistor; wherein a gate of the switching transistor is coupled to the light-emission control signal terminal, a first electrode of the switching transistor is coupled to the first node, and a second electrode of the switching transistor is coupled to one end of the resistor; and the other end of the resistor is coupled to the third power supply terminal.

Optionally, the target signal terminal is a power supply signal terminal, a potential of a power supply signal provided by the power supply signal terminal being adjustable; and the adjusting sub-circuit includes a control transistor;

wherein a gate of the control transistor is coupled to the power supply signal terminal, a first electrode of the control transistor is coupled to the first node, and a second electrode of the control transistor is coupled to the third power supply terminal.

Optionally, the shaping sub-circuit includes: one inverter coupled between the first node and the second node; or a plurality of inverters connected in series between the first node and the second node.

Optionally, each inverter includes: a first inverting transistor and a second inverting transistor; wherein a gate of the first inverting transistor and a gate of the second inverting transistor are coupled and are both configured to be coupled to the first node;

a second electrode of the first inverting transistor and a second electrode of the second inverting transistor are coupled and are both configured to be coupled to the second node; and a first electrode of the first inverting transistor is coupled to a fourth power supply terminal, and a first electrode of the second inverting transistor is coupled to a fifth power supply terminal.

Optionally, the shaping sub-circuit includes: two inverters connected in series between the first node and the second node.

Optionally, the first storage sub-circuit includes: a storage capacitor;

wherein one end of the storage capacitor is coupled to the second power supply terminal, and the other end of the storage capacitor is coupled to the first node.

Optionally, the data writing circuit includes: a data writing transistor; the light-emission control circuit includes: a first light-emission control transistor and a second light-emission control transistor; wherein a gate of the data writing transistor is coupled to the gate signal terminal, a first electrode of the data writing transistor is coupled to the first data signal terminal, and a second electrode of the data writing transistor is coupled to the first node;

a gate of the first light-emission control transistor is coupled to the second node, a first electrode of the first light-emission control transistor is coupled to the reference signal terminal, and a second electrode of the first light-emission control transistor is coupled to a first electrode of the second light-emission control transistor; and a gate of the second light-emission control transistor is coupled to the light-emission control signal terminal, and a second electrode of the second light-emission control transistor is coupled to the third node.

Optionally, the light-emission driving circuit includes: a data writing sub-circuit, a reset sub-circuit, a second storage sub-circuit, a light-emission control sub-circuit, a compensation sub-circuit and a driving sub-circuit; wherein the data writing sub-circuit is coupled to the gate signal terminal, the second data signal terminal and a fourth node, and the data writing sub-circuit is configured to output the second data signal to the fourth node in response to the gate driving signal;

the reset sub-circuit is coupled to a reset signal terminal, an initial signal terminal and the third node, and the reset sub-circuit is configured to output an initial signal provided by the initial signal terminal to the third node in response to a reset signal provided by the reset signal terminal;

the second storage sub-circuit is coupled to the third node and the first power supply terminal, and the second storage sub-circuit is configured to control the potential of the third node under control of the first power supply signal;

the light-emission control sub-circuit is coupled to the light-emission control signal terminal, the first power supply terminal, the fourth node, a fifth node and the light-emitting element, and the light-emission control sub-circuit is configured to output the first power supply signal to the fourth node and control conduction/non-conduction between the fifth node and the light-emitting element, in response to the light-emission control signal;

the compensation sub-circuit is coupled to the gate signal terminal, the third node and the fifth node, and the compensation sub-circuit is configured to adjust the potential of the third node based on a potential of the fifth node in response to the gate driving signal; and the driving sub-circuit is coupled to the third node, the fourth node and the fifth node, and the driving sub-circuit is configured to output a driving signal to the fifth node in response to the potential of the third node and a potential of the fourth node.

In another aspect, a method for driving a pixel circuit is provided. The pixel circuit includes: a data writing circuit, a light-emission adjusting circuit, a light-emission control circuit, and a light-emission driving circuit, wherein the data writing circuit is coupled to a gate signal terminal, a first data signal terminal and a first node; the light-emission adjusting circuit is coupled to a target signal terminal, the first node and a second node; the light-emission control circuit is coupled to the second node, a reference signal terminal, a light-emission control signal terminal and a third node; and the light-emission driving circuit is coupled to the third node, the gate signal terminal, a first power supply terminal, a second data signal terminal and a light-emitting element. The method includes:

in a data writing stage, outputting, by the data writing circuit, a first data signal provided by the first data signal terminal to the first node in response to a gate driving signal provided by the gate signal terminal, and storing, by the light-emission adjusting circuit, a potential of the first node, wherein a potential of the gate driving signal is a first potential; and in a light-emitting stage, adjusting, by the light-emission adjusting circuit, the potential of the first node in response to a target signal provided by the target signal terminal and adjusting, by the light-emission adjusting circuit, a potential of the second node based on the potential of the first node; and outputting, by the light-emission control circuit, a reference signal provided by the reference signal terminal to the third node in response to the potential of the second node and a light-emission control signal provided by the light-emission control signal terminal, a potential of the reference signal being a second potential; and outputting, by the light-emission driving circuit, a driving signal to the light-emitting element in response to a potential of the third node, the first data signal and a first power supply signal provided by the first power supply terminal, wherein a potential of the target signal and a potential of the light-emission control signal are both the first potential.

In still another aspect, a display substrate is provided. The display substrate includes a plurality of pixel units, wherein at least one of the pixel units includes: a light-emitting element, and the pixel circuit described in the above aspect and coupled to the light-emitting element.

Optionally, the light-emitting element is a micro light-emitting diode.

In yet still another aspect, a display apparatus is provided. The display apparatus includes: a signal driving circuit, and the display substrate described in the above aspect, wherein the signal driving circuit is coupled to signal terminals in the pixel circuit in the display substrate, and the signal driving circuit is configured to provide signals to the signal terminals.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 5 is a schematic structural diagram of still yet another pixel circuit according to an embodiment of the present disclosure;

FIG. 6 is a flowchart of a method for driving a pixel circuit according to an embodiment of the present disclosure;

DETAILED DESCRIPTION

Figure 1:
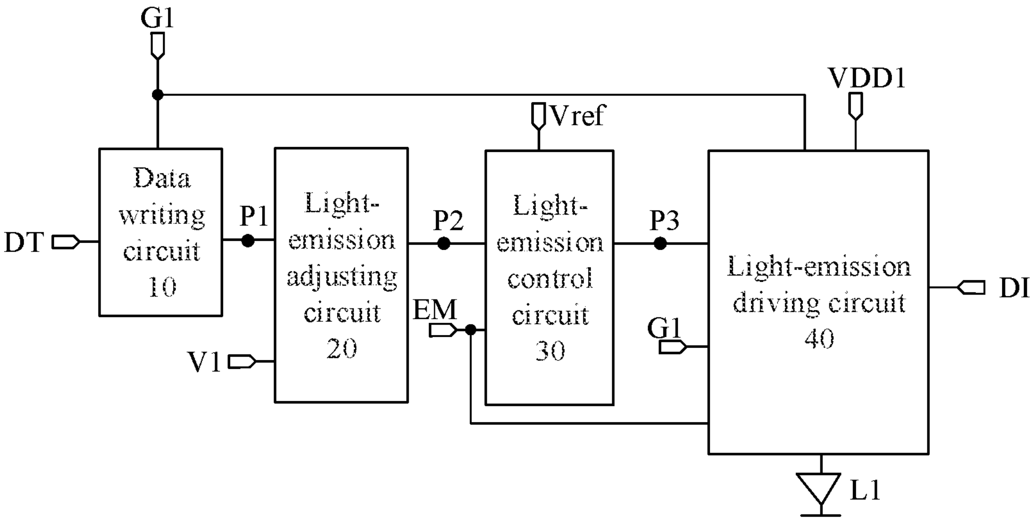
FIG. 1 is a schematic structural diagram of a pixel circuit according to an embodiment of the present disclosure.

For clearer descriptions of the objectives, technical solutions, and advantages of the present disclosure, the embodiments of the present disclosure are described in detail hereinafter with reference to the accompanying drawings.

Transistors used in all the embodiments of the present disclosure may be thin film transistors, field effect transistors, or other devices with the same properties, and the transistors used in the embodiments of the present disclosure are mainly switching transistors according to the functions in a circuit. Since a source and a drain of the switching transistor used herein are symmetrical, the source and the drain are interchangeable. In the embodiments of the present disclosure, the source is referred to as a first electrode and the drain is referred to as a second electrode, or the drain is referred to as the first electrode and the source as the second electrode. According to the form in the drawings, it is designated that a middle terminal of the transistor is a gate, a signal input terminal is the source, and a signal output terminal is the drain. The switching transistors used in the embodiments of the present disclosure may be P-type switching transistors, and the P-type switching transistor is turned on when the gate is at a low level, and turned off when the gate is at a high level. In addition, a plurality of signals in the embodiments of the present disclosure correspondingly have a first potential and a second potential. The first potential and the second potential only represent that the potential of the signal has two state quantities, rather than representing that the first potential or the second potential in the whole specification has a specific value. In the embodiments of the present disclosure, the first potential being an effective potential is taken as an example for description.

A micro LED may be regarded as a self-luminous element after LEDs are miniaturized and matrixed. A display industry chain of the micro LED is mainly formed of three parts: a micro LED chip (i.e., a micro LED light-emitting element), a drive back plate (i.e., a pixel circuit driving the micro LED to emit light), and a chip transfer operation (i.e., an operation of transferring the micro LED chip to a base substrate provided with the pixel circuit).

Affected by the properties of the micro LED per se, when the pixel circuit in the related art drives the micro LED to emit light, the main wave peak of a display gray scale of the micro LED is drifted with the change of a current density, or the display brightness of the micro LED is poor in uniformity at a low current density, which eventually leads to a poor display effect. The embodiments of the present disclosure provide a new pixel circuit, which can flexibly adjust the display gray scale of the micro LED by flexibly controlling a light-emitting duration of the micro LED, thereby solving the problem of poor display effect due to the influence of the properties of the micro LED per se. Certainly, the pixel circuit according to the embodiments of the present disclosure is not limited to the driving of the micro LEDs, and can also drive other types of light-emitting elements (for example, LEDs).

It should be noted that the base substrate provided with the pixel circuit may be a glass substrate, or a printed circuit board (PCB). Compared with the PCB, using the glass substrate as the base substrate can achieve a high resolution (pixels per inch (PPI)), and the cost is relatively low. Therefore, the following embodiments of the present disclosure all take the pixel circuit being disposed on the glass substrate as an example to introduce the structure of the pixel circuit.

FIG. 1 is a schematic structural diagram of a pixel circuit according to an embodiment of the present disclosure. As shown in FIG. 1, the pixel circuit may include: a data writing circuit 10, a light-emission adjusting circuit 20, a light-emission control circuit 30 and a light-emission driving circuit 40.

The data writing circuit 10 may be coupled to a gate signal terminal G1, a first data signal terminal DT and a first node P1. The data writing circuit 10 may be configured to output a first data signal provided by the first data signal terminal DT to the first node P1 in response to a gate driving signal provided by the gate signal terminal G1.

For example, the data writing circuit 10 may output the first data signal provided by the first data signal terminal DT to the first node P1 when a potential of the gate driving signal provided by the gate signal terminal G1 is a first potential.

The light-emission adjusting circuit 20 may be coupled to a target signal terminal V1, the first node P1 and a second node P2. The light-emission adjusting circuit 20 may be configured to store a potential of the first node P1, and may be configured to adjust the potential of the first node P1 in response to a target signal provided by the target signal terminal V1, and adjust a potential of the second node P2 based on the potential of the first node P1.

For example, the light-emission adjusting circuit 20 may adjust the potential of the first node P1 when a potential of the target signal provided by the target signal terminal V1 is the first potential, and adjust the potential of the second node P2 based on the potential of the first node P1.

Optionally, adjusting the potential of the first node P1 may refer to: pulling up or pulling down the potential of the first data signal written to the first node P1 by the data writing circuit 10. Adjusting the potential of the second node P2 based on the potential of the first node P1 may refer to shaping the potential of the first node P1, that is, the potential of the second node P2 and the potential of the first node P1 are actually the same in size.

The light-emission control circuit 30 may be coupled to the second node P2, a reference signal terminal Vref, a light-emission control signal terminal EM and a third node P3. The light-emission control circuit 30 may be configured to output a reference signal provided by the reference signal terminal Vref to the third node P3 in response to the potential of the second node P2 and a light-emission control signal provided by the light-emission control signal terminal EM.

For example, the light-emission control circuit 30 may output the reference signal provided by the reference signal terminal Vref to the third node P3 when the potential of the second node P2 is the first potential and a potential of the light-emission control signal provided by the light-emission control signal terminal EM is the first potential. The potential of the reference signal may be a second potential.

Optionally, the first potential may be an effective potential, and the second potential may be an ineffective potential. In the case that the first potential is a low potential relative to the second potential, that is, the voltage of a signal of the first potential is lower than the voltage of a signal of the second potential, adjusting the potential of the first node P1 by the light-emission adjusting circuit 20 may refer to pulling down potential of the first node P1. As such, when the potential of the first node P1 is pulled down to the first potential, the light-emission control circuit 30 may output the reference signal to the third node P3 in response to the light-emission control signal. Similarly, in the case that the first potential is a high potential relative to the second potential, that is, the voltage of the signal of the first potential is greater than the voltage of the signal of the second potential, adjusting the potential of the first node P1 by the light-emission adjusting circuit 20 may refer to pulling up the potential of the first node P1. As such, when the potential of the first node P1 is pulled up to the first potential, the light-emission control circuit 30 may output the reference signal to the third node P3 in response to the light-emission control signal. Correspondingly, in the embodiment of the present disclosure, the time length of pulling down or pulling up the potential of the first node P1 to the first potential may be controlled by flexibly setting the potential of the first data signal provided by the first data signal terminal DT, thereby controlling the moment at which the light-emission control circuit 30 outputs the reference signal to the third node P3.

The light-emission driving circuit 40 may be coupled to the third node P3, the gate signal terminal G1, a first power supply terminal VDD1, a second data signal terminal D1, and a light-emitting element L1. The light-emission driving circuit 40 may be configured to output a driving signal to the light-emitting element L1 in response to the gate driving signal, the potential of the third node P3, a first power supply signal provided by the first power supply terminal VDD1 and a second data signal provided by the second data signal terminal D1.

The light-emission driving circuit 40 needs to output, in response to the potential of the third node P3, the driving signal (for example, a driving current) to the light-emitting element L1 to drive the light-emitting element L1 to emit light. Therefore, by setting the moment at which the light-emission adjusting circuit 20 controls the light-emission control circuit 30 to output the reference signal to the third node P3, the cut-off moment of outputting the driving signal by the light-emission driving circuit 40 can be controlled, that is, the time length of outputting the driving signal by the light-emission driving circuit 40 can be controlled. Therefore, the light-emitting duration of the light-emitting element L1 is controlled.

Therefore, the first data signal may also be referred to as a time length control signal. The data writing circuit 10, the light-emission adjusting circuit 20 and the light-emission control circuit 30 outputting the reference signal to the third node P3 based on the first data signal may be referred to as time control circuits. Certainly, in the case that the light-emission adjusting circuit 20 pulls down the potential of the first node P1, the light-emission adjusting circuit 20 may actually be referred to as a discharge circuit in the time control circuit. In addition, since the light-emission driving circuit 40 outputs the driving current to the light-emitting element L1 in response to the second data signal provided by the second data signal terminal D1, the second data signal may also be referred to as a current control data signal.

In summary, the embodiment of the present disclosure provides a pixel circuit. In the pixel circuit, the light-emission adjusting circuit can adjust the data signal written by the data writing circuit to the first node and can adjust the potential of the second node based on the potential of the first node; and the light-emission control circuit can output the reference signal to the third node under control of the potential of the second node. Furthermore, the light-emission driving circuit needs to output, in response to the potential of the third node, the driving signal to the light-emitting element to drive the light-emitting element to emit light. Therefore, when the pixel circuit is driven, the potentials of respective signals can be flexibly set to control the moment of outputting the reference signal to the third node, so as to control the time length of outputting the driving signal by the light-emission driving circuit, thereby controlling the light-emitting duration of the light-emitting element. In this way, the light-emitting element can work under a high current density with better uniformity, which ensures a better display effect.

Figure 2:
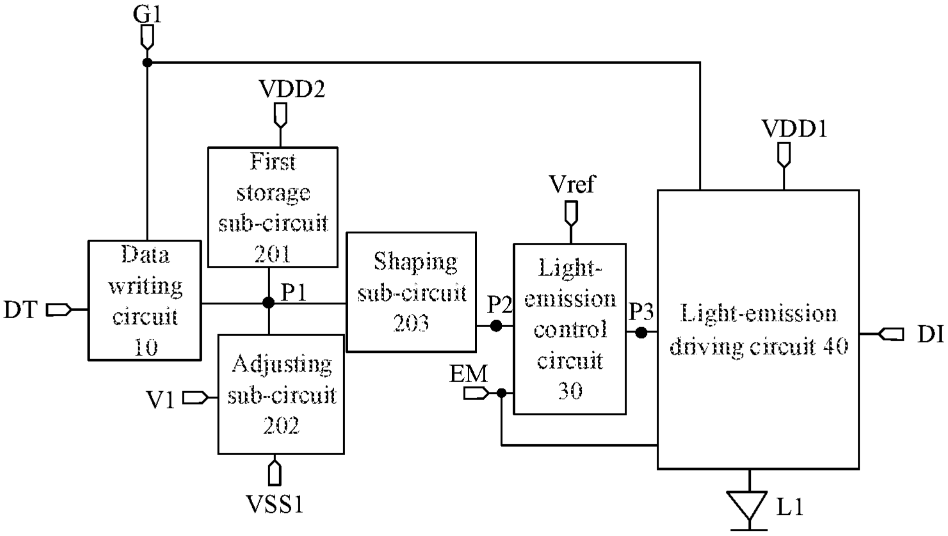
FIG. 2 is a schematic structural diagram of another pixel circuit according to an embodiment of the present disclosure.

In the following embodiments of the present disclosure, the pixel circuit is described by taking an example in which the potential of the first node P1 is pulled down. FIG. 2 is a schematic structural diagram of another pixel circuit according to an embodiment of the present disclosure. As shown in FIG. 2, the light-emission adjusting circuit 20 may include: a first storage sub-circuit 201, an adjusting sub-circuit 202 and a shaping sub-circuit 203.

The first storage sub-circuit 201 may be coupled to a second power supply terminal VDD2 and the first node P1 The first storage sub-circuit 201 may be configured to store the potential of the first node P1 under the control of a second power supply signal provided by the second power supply terminal VDD2.

The adjusting sub-circuit 202 may be coupled to the target signal terminal V1, the first node P1 and a third power supply terminal VSS1. The adjusting sub-circuit 202 may be configured to adjust the potential of the first node P1 in response to the target signal and a third power supply signal provided by the third power supply terminal VSS1.

For example, the adjusting sub-circuit 202 may adjust the potential of the first node P1 under control of the target signal and the third power supply signal provided by the third power supply terminal VSS1 when the potential of the target signal is the first potential. Optionally, the potential of the third power supply signal may be the second potential.

The shaping sub-circuit 203 may be coupled to the first node P1 and the second node P2. The shaping sub-circuit 203 may be configured to adjust the potential of the second node P2 based on the potential of the first node P1.

For example, the shaping sub-circuit 203 may perform shaping processing on the potential of the first node P1, and output the shaped signal to the second node P2. Optionally, the shaping processing may include shaping the potential of the first node into a square wave signal with a steep slope (for example, 90 degrees).

Figure 3:
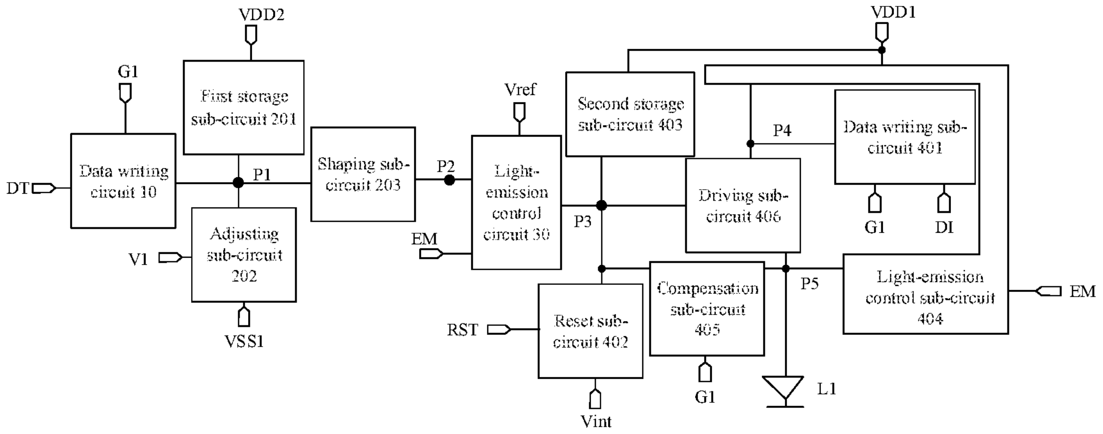
FIG. 3 is a schematic structural diagram of yet another pixel circuit according to an embodiment of the present disclosure.

FIG. 3 is a schematic structural diagram of yet another pixel circuit according to an embodiment of the present disclosure. As shown in FIG. 3, the light-emission driving circuit 40 may include: a data writing sub-circuit 401, a reset sub-circuit 402, a second storage sub-circuit 403, a light-emission control sub-circuit 404, a compensation sub-circuit 405 and a driving sub-circuit 406.

The data writing sub-circuit 401 may be coupled to the gate signal terminal G1, the second data signal terminal D1 and a fourth node P4. The data writing sub-circuit 401 may be configured to output the second data signal to the fourth node P4 in response to the gate driving signal.

For example, the data writing sub-circuit 401 may output the second data signal to the fourth node P4 when the potential of the gate driving signal is the first potential.

The reset sub-circuit 402 may be coupled to a reset signal terminal RST, an initial signal terminal Vint and the third node P3. The reset sub-circuit 402 may be configured to output an initial signal provided by the initial signal terminal Vint to the third node P3 in response to a reset signal provided by the reset signal terminal RST.

For example, the reset sub-circuit 402 may output the initial signal provided by the initial signal terminal Vint to the third node P3 when the potential of the reset signal provided by the reset signal terminal RST is the first potential. The potential of the initial signal may be the second potential, thereby resetting the third node P3.

The second storage sub-circuit 403 may be coupled to the third node P3 and the first power supply terminal VDD1. The second storage sub-circuit 403 may be configured to control the potential of the third node P3 under control of the first power supply signal. For example, the second storage sub-circuit 403 may be configured to store the potential written to the third node P3.

The light-emission control sub-circuit 404 may be coupled to the light-emission control signal terminal EM, the first power supply terminal VDD1, the fourth node P4, a fifth node P5 and the light-emitting element L1. The light-emission control sub-circuit 404 may be configured to output the first power supply signal to the fourth node P4 and control the conduction/non-conduction between the fifth node P5 and the light-emitting element L1, in response to the light-emission control signal.

For example, the light-emission control sub-circuit 404 may output the first power supply signal to the fourth node P4 and may control the fifth node P5 to be conducted with the light-emitting element L1, when the potential of the light-emission control signal is the first potential.

The compensation sub-circuit 405 may be coupled to the gate signal terminal G1, the third node P3 and the fifth node P5. The compensation sub-circuit 405 may be configured to adjust the potential of the third node P3 based on the potential of the fifth node P5 in response to the gate driving signal.

For example, the compensation sub-circuit 405 may adjust the potential of the third node P3 based on the potential of the fifth node P5 when the potential of the gate driving signal is the first potential.

The driving sub-circuit 406 may be coupled to the third node P3, the fourth node P4 and the fifth node P5. The driving sub-circuit 406 may be configured to output a driving signal to the fifth node P5 in response to the potential of the third node P3 and the potential of the fourth node P4.

For example, when the potential of the third node P3 is the first potential, the driving sub-circuit 406 may output the driving current to the fifth node P5 based on the potential of the third node P3 and the potential of the fourth node P4.

Optionally, in the embodiment of the present disclosure, the rate at which the adjusting sub-circuit 202 adjusts the potential of the first node P1 may be related or not related to the potential of the target signal provided by the target signal terminal V1 coupled to the adjusting sub-circuit 202.

Figure 4:
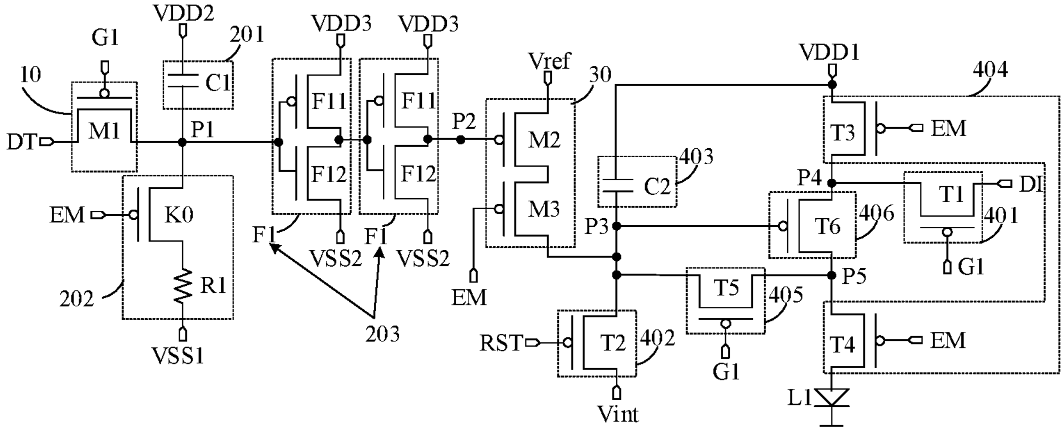
FIG. 4 is a schematic structural diagram of still yet another pixel circuit according to an embodiment of the present disclosure.

As an optional implementation, as shown in FIG. 4, in the case that the rate at which the adjusting sub-circuit 202 adjusts the potential of the first node P1 is not related to the potential of the target signal, the target signal terminal V1 may be the light-emission control signal terminal EM. The adjusting sub-circuit 202 may include: a switching transistor K0 and a resistor R1.

A gate of the switching transistor K0 may be coupled to the light-emission control signal terminal EM, a first electrode of the switching transistor K0 may be coupled to the first node P1, and a second electrode of the switching transistor K0 may be coupled to one end of the resistor R1. The other end of the resistor R1 may be coupled to the third power supply terminal VSS1.

In this implementation, the rate of adjusting (for example, pulling down) the potential of the first node P1 may be controlled by flexibly setting the resistance value of the resistor R1.

As another optional implementation, as shown in FIG. 5, in the case that the rate at which the adjusting sub-circuit 202 adjusts the potential of the first node P1 is related to the potential of the target signal, the target signal terminal V1 may be a power supply signal terminal VG1, and the potential of a power supply signal provided by the power supply signal terminal VG1 is adjustable. The adjusting sub-circuit 202 may only include: a control transistor K1.

A gate of the control transistor K1 may be coupled to the power supply signal terminal VG1, a first electrode of the control transistor K1 may be coupled to the first node P1, and a second electrode of the control transistor K1 may be coupled to the third power supply terminal VSS1.

In this implementation, the rate of adjusting the potential of the first node P1 may be controlled by flexibly setting the potential of the power supply signal provided by the power supply signal terminal VG1.

Optionally, the shaping sub-circuit 203 may include: one inverter coupled between the first node P1 and the second node P2, or a plurality of inverters connected in series between the first node P1 and the second node P2.

For example, in combination with FIG. 4 and FIG. 5, an optional shaping sub-circuit 203 is shown by taking an example in which the shaping sub-circuit 203 includes two inverters F1 connected in series between the first node P1 and the second node P2.

Each inverter F1 may include a first inverting transistor F11 and a second inverting transistor F12.

A gate of the first inverting transistor F11 and a gate of the second inverting transistor F12 are coupled, and may be both configured to be coupled to the first node P1.

A second electrode of the first inverting transistor F11 and a second electrode of the second inverting transistor F12 are coupled, and may be both configured to be coupled to the second node P2.

Optionally, coupling to the first node P1 and the second node P2 may be indirect coupling as shown in FIG. 4 or FIG. 5, or may also be direct coupling. The indirect coupling refers to that every two adjacent inverters F1 connected in series in the plurality of inverters F1 are coupled to each other. The first inverter F1 along a signal transmission direction is coupled to the first node P1, and the last inverter F1 along the signal transmission direction is coupled to the second node P2. The direct coupling refers to that in the plurality of inverters F1, each inverter F1 is directly coupled to the first node P1 and is directly coupled to the second node P2.

The first electrode of the first inverting transistor F11 may be coupled to a fourth power supply terminal VDD3, and the first electrode of the second inverting transistor F12 may be coupled to a fifth power supply terminal VSS2.

The potential of a fourth power supply signal provided by the fourth power supply terminal VDD3 may be the first potential, and the potential of a fifth power supply signal provided by the fifth power supply terminal VSS2 may be the second potential. The fourth power supply signal and the fifth power supply signal may be working driving signals of the inverters F1.

Continuing referring to FIG. 4 and FIG. 5, the first storage sub-circuit 201 may include: a storage capacitor C1.

One end of the storage capacitor C1 may be coupled to the second power supply terminal VDD2, and the other end of the storage capacitor C1 may be coupled to the first node P1. The potential of the second power supply signal may be the first potential.

Continuing referring to FIG. 4 and FIG. 5, the data writing circuit 10 may include: a data writing transistor M1. The light-emission control circuit 30 includes a first light-emission control transistor M2 and a second light-emission control transistor M3.

A gate of the data writing transistor M1 may be coupled to the gate signal terminal G1, a first electrode of the data writing transistor M1 may be coupled to the first data signal terminal DT, and a second electrode of the data writing transistor M1 may be coupled to the first node P1.

A gate of the first light-emission control transistor M2 may be coupled to the second node P2, a first electrode of the first light-emission control transistor M2 may be coupled to the reference signal terminal Vref, and a second electrode of the first light-emission control transistor T1 may be coupled to a first electrode of the second light-emission control transistor M3.

A gate of the second light-emission control transistor M3 may be coupled to the light-emission control signal terminal EM, and a second electrode of the second light-emission control transistor M3 may be coupled to the third node P3.

Continuing referring to FIG. 4 and FIG. 5, the data writing sub-circuit 401 may include a data signal writing transistor T1. The reset sub-circuit 402 may include a reset transistor T2. The second storage sub-circuit 403 may include a signal storage capacitor C2. The light-emission control sub-circuit 404 may include a third light-emission control transistor T3 and a fourth light-emission control transistor T4. The compensation sub-circuit 405 may include a compensation transistor T5. The driving sub-circuit 406 may include a driving transistor T6.

A gate of the data signal writing transistor T1 may be coupled to the gate signal terminal G1, a first electrode of the data signal writing transistor T1 may be coupled to the second data signal terminal D1, and a second electrode of the data signal writing transistor T1 may be coupled to the fourth node P4.

A gate of the reset transistor T2 may be coupled to the reset signal terminal RST, a first electrode of the reset transistor T2 may be coupled to the initial signal terminal Vint, and a second electrode of the reset transistor T2 may be coupled to the third node P3.

One end of the signal storage capacitor C2 may be coupled to the third node P3, and the other end of the signal storage capacitor C2 may be coupled to the first power supply terminal VDD1.

A gate of the third light-emission control transistor T3 may be coupled to the light-emission control signal terminal EM, a first electrode of the third light-emission control transistor T3 may be coupled to the first power supply terminal VDD1, and a second electrode of the third light-emission control transistor T3 may be coupled to the fourth node P4.

A gate of the fourth light-emission control transistor T4 may be coupled to the light-emission control signal terminal EM, a first electrode of the fourth light-emission control transistor T4 may be coupled to the fifth node P5, and a second electrode of the fourth light-emission control transistor T4 may be coupled to the light-emitting element L1.

A gate of the compensation transistor T5 may be coupled to the gate signal terminal G1, a first electrode of the compensation transistor T5 may be coupled to the fifth node P5, and a second electrode of the compensation transistor T5 may be coupled to the third node P3.

A gate of the driving transistor T6 may be coupled to the third node P3, a first electrode of the driving transistor T6 may be coupled to the fourth node P4, and a second electrode of the driving transistor T6 may be coupled to the fifth node P5.

It should be noted that the coupling described in the embodiments of the present disclosure may include: electrical connection between two terminals or direct connection between two terminals (for example, the connection is established between the two terminals through a signal line). In addition, the above embodiment is described by taking an example in which the respective transistors are P-type transistors, and the first potential is a low potential relative to the second potential. Certainly, the respective transistors may also be N-type transistors, and the first potential may be a high potential relative to the second potential in the case that the respective transistors are N-type transistors.

It should also be noted that, in the embodiment of the present disclosure, in addition to the 6T1C (that is, six transistors and one capacitor) structure shown in FIG. 4 or FIG. 5, the light-emission driving circuit 40 may further be of a structure including other numbers of transistors, such as a 2T1C structure or a 4T1C structure.

In summary, the embodiment of the present disclosure provides a pixel circuit. In the pixel circuit, the light-emission adjusting circuit can adjust the data signal written by the data writing circuit to the first node and can adjust the potential of the second node based on the potential of the first node; and the light-emission control circuit can output the reference signal to the third node under control of the potential of the second node. Furthermore, the light-emission driving circuit needs to output, in response to the potential of the third node, the driving signal to the light-emitting element to drive the light-emitting element to emit light. Therefore, when the pixel circuit is driven, the potentials of respective signals can be flexibly set to control the moment of outputting the reference signal to the third node, so as to control the time length of outputting the driving signal by the light-emission driving circuit, thereby controlling the light-emitting duration of the light-emitting element. In this way, the light-emitting element can work under a high current density with better uniformity, which ensures a better display effect.

FIG. 6 is a flowchart of a method for driving a pixel circuit according to an embodiment of the present disclosure. The method may be applied to the pixel circuit according to any one of FIG. 1 to FIG. 5. As shown in FIG. 6, the method may include the following steps.

In step 601, in a data writing stage in which the potential of a gate driving signal provided by a gate signal terminal is a first potential, a data writing circuit outputs a first data signal provided by a first data signal terminal to a first node in response to the gate driving signal, and a light-emission adjusting circuit stores a potential of the first node.

In step 602, in a light-emitting stage in which the potential of a target signal provided by a target signal terminal and the potential of a light-emission control signal provided by a light-emission control signal terminal are both the first potential, the light-emission adjusting circuit adjusts the potential of the first node in response to the target signal, and adjusts the potential of a second node based on the potential of the first node; a light-emission control circuit outputs a reference signal provided by a reference signal terminal to a third node in response to the potential of the second node and the light-emission control signal; and a light-emission driving circuit outputs a driving signal to a light-emitting element in response to a potential of the third node, the first data signal and a first power supply signal provided by a first power supply terminal.

Optionally, the potential of the reference signal may be a second potential.

In summary, the embodiment of the present disclosure provides a method for driving a pixel circuit. In the method, the light-emission adjusting circuit can adjust the data signal written by the data writing circuit to the first node and can adjust the potential of the second node based on the potential of the first node: and the light-emission control circuit can output the reference signal to the third node under control of the potential of the second node. Furthermore, the light-emission driving circuit needs to output, in response to the potential of the third node, the driving signal to the light-emitting element, to drive the light-emitting element to emit light. Therefore, when the pixel circuit is driven, the potentials of respective signals can be flexibly set to control the moment of outputting the reference signal to the third node, so as to control the time length of outputting the driving signal by the light-emission driving circuit, thereby controlling the light-emitting duration of the light-emitting element. In this way, the light-emitting element can work under a high current density with better uniformity, which ensures a better display effect.

In combination with the pixel circuit shown in any one of FIG. 3 to FIG. 5, in order to ensure working stability of the pixel circuit, prior to the data writing stage, that is, prior to the above step 601, the method for driving the pixel circuit may further include a reset stage. In the reset stage, the potential of the reset signal provided by the reset signal terminal RST may be the first potential. The light-emission driving circuit 40 may output the initial signal provided by the initial signal terminal Vint to the third node P3 in response to the reset signal, thereby resetting the third node P3.

By taking an example in which respective transistors in the pixel circuit shown in FIG. 4 are P-type transistors, and the first potential (that is, the effective potential) is a low potential relative to the second potential (that is, the ineffective potential), the driving principle of the pixel circuit according to the embodiment of the present disclosure is introduced in detail.

Figure 7:
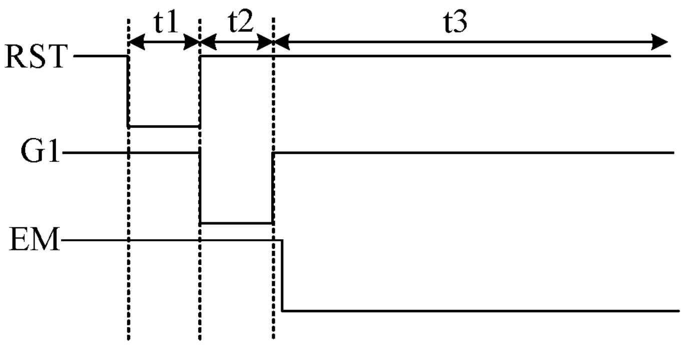
FIG. 7 is a timing sequence diagram of respective signal terminals coupled to a pixel circuit according to an embodiment of the present disclosure.

FIG. 7 is a timing sequence diagram of respective signal terminals in a pixel circuit according to an embodiment of the present disclosure. As shown in FIG. 7, in the reset stage t1, the potential of the reset signal provided by the reset signal terminal RST is the first potential, and the reset transistor T2 is turned on. The initial signal terminal Vint may output the initial signal at the second potential to the third node P3 through the reset transistor T2, so as to reset the third node P3, and the signal storage capacitor C2 stores the potential of the third node P3. In this case, the potentials at two ends of the signal storage capacitor C2 are the potential of the initial signal and the potential of the first power supply signal provided by the first power supply terminal VDD1 respectively, and the pixel circuit may work in a determined initial state.

Figure 8:
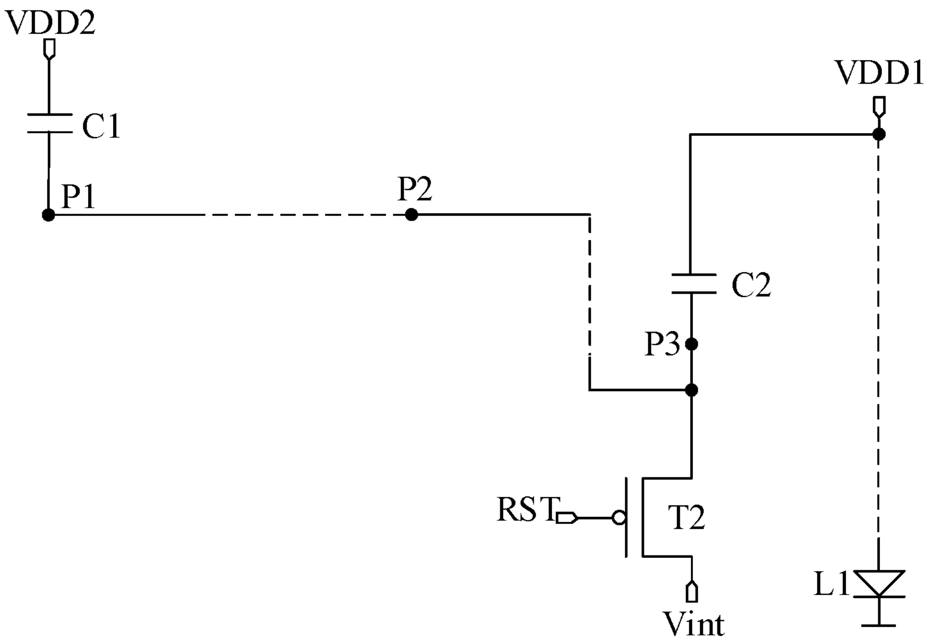
FIG. 8 is an equivalent circuit diagram of a pixel circuit in a reset stage according to an embodiment of the present disclosure.

In addition, referring to FIG. 7, in the reset stage t1, the potential of the gate driving signal provided by the gate signal terminal G1 and the potential of the light-emission control signal provided by the light-emission control signal terminal EM are both the second potentials. Accordingly, transistors, except the reset transistor T2, are in a turned-off state. For the equivalent circuit diagram of the pixel circuit in the reset stage t1, reference may be made to FIG. 8 (the dotted line in the figure indicates non-conduction).

Continuing to refer to FIG. 7, in the data writing stage 12, the potential of the gate driving signal provided by the gate signal terminal G1 jumps to the first potential, and the data signal writing transistor T1, the compensation transistor T5 and the data writing transistor M1 are all turned on. In the above reset stage t1, the initial signal is written to the third node P3, and the signal storage capacitor C2 stores the potential of the third node P3. Therefore, the driving transistor T6 is also turned on in the data writing stage t2. The first data signal terminal DT may output the first data signal to the first node P1 through the data writing transistor M1, and the storage capacitor C1 stores the potential of the first node P1. The second data signal terminal DI may output the second data signal to the fourth node P4 through the data signal writing transistor T1. The potential of the fourth node P4 may be output to the fifth node P5 through the driving transistor T6. Then, the compensation transistor T5 may adjust the potential of the third node P3 based on the potential of the fifth node P5 until the potential of the third node P3 is adjusted to the sum of the potential of the second data signal and a threshold voltage of the driving transistor T6, and the signal storage capacitor C2 continues to store the potential of the third node P3. Assuming that the potential of the second data signal is VdataI and the threshold voltage of the driving transistor T6 is Vth, then the potential of the third node P3 may become VdataI+Vth, after the data writing stage t2 is ended.

Figure 9:
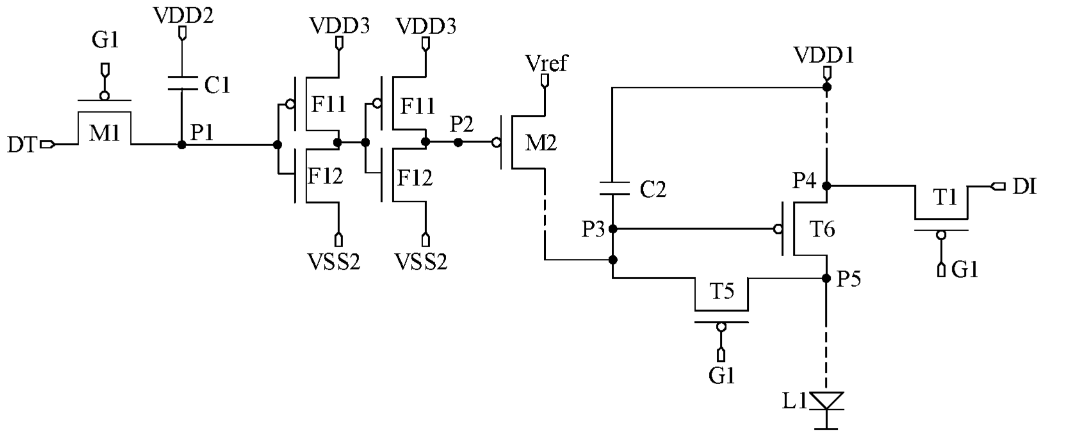
FIG. 9 is an equivalent circuit diagram of a pixel circuit in a data writing stage according to an embodiment of the present disclosure.

In addition, referring to FIG. 7, in the data writing stage t2, the potential of the reset signal provided by the reset signal terminal RST and the potential of the light-emission control signal provided by the light-emission control signal terminal EM are both the second potential. Transistors, other than transistors which are turned on in the data writing stage t2 described above, are all turned off. For the equivalent circuit diagram of the pixel circuit in the data writing stage t2, reference may be made to FIG. 9 (the dotted line in the figure indicate non-conduction).

Continuing to refer to FIG. 7, in the light-emitting stage t3, the potential of the light-emission control signal provided by the light-emission control signal terminal EM is the first potential, the third light-emission control transistor T3, the fourth light-emission control transistor T4, the switching transistor K0 and the second light-emission control transistors M3 are all turned on, and the fifth node P5 and the light-emitting element L1 are conducted. In addition, in the data writing stage 12, the potential of the third node P3 becomes VdataI+Vth. Therefore, the driving transistor T6 is also turned on in the light-emitting stage t3. The first power supply terminal VDD1 outputs the first power supply signal at the first potential to the fourth node P4 through the third light-emission control transistor T3. Accordingly, the driving transistor T6 may output the driving current to the fifth node P5 based on the potential of the first power supply signal and the potential of the third node P3. The driving current may be continuously output to the light-emitting element L1 through the fourth light-emission control transistor T4, and the light-emitting element L1 emits light.

For example, assuming that the potential of the first power supply signal is Vdd, the potential of the gate of the driving transistor T6 is denoted by Vg1, the potential of the source of the driving transistor T6 (such as the fourth node P4) is denoted by Vs1, and the gate-source voltage of the driving transistor T6 is denoted by Vgs1, then Vgs1 according to the embodiment of the present disclosure may satisfy:

$$Vgs1 = Vg1 - Vs1 = V\,data\,I + Vth - Vdd; \qquad \text{Formula (1)}$$

The driving current Iled generated by the driving transistor T6 satisfies:

$$Iled = 1/2 * \mu * Cox * W/L * (Vgs1 - Vth)^2; \qquad \text{Formula (2)}$$

By substituting the Vgs1 calculated according to Formula (1) into Formula (2), it may be acquired that the driving current Iled finally output by the driving transistor T6 according to the embodiment of the present disclosure satisfies:

$$Iled = 1/2 * \mu * Cox * W/L * V\,data\,I - Vdd)^2; \qquad \text{Formula (3)}$$

wherein μ is the carrier mobility of the driving transistor T6, Cox is the capacitance of a gate insulating layer of the driving transistor T6. W/L is the width-to-length ratio of the driving transistor T6, and the above parameters all belong to characteristic parameters of the driving transistor T6. Therefore, it can be seen from the above Formula (3) that when the light-emitting element L1 works normally, the magnitude of the driving current Iled for driving the light-emitting element L1 is only related to the first power supply signal provided by the first power supply terminal VDD1 and the second data signal provided by the second data signal terminal DI, but is not related to the threshold voltage Vth of the driving transistor T6. Therefore, the driving current output to the light-emitting element L1 is not affected by the drift of the threshold voltage of the driving transistor T6, which effectively ensures display uniformity.

It should be noted that, if the light-emitting element L1 is a micro LED, the light-emitting efficiency of the micro LED changes significantly under a low current density, and the uniformity is poor. Therefore, by flexibly setting the potential of the second data signal provided by the second data signal terminal DI, that is, flexibly setting Vdata1, the micro LED can work under a high current density, that is, the region with a stable light-emitting efficiency, which ensures display stability.

In addition, in the light-emitting stage t3, since the switching transistor K0 is turned on, the potential of the first node P1, that is, the electric charge stored by the storage capacitor C1 flows to the third power supply terminal VSS1 through the switching transistor K0 and the resistor R1. Thus, an electric leakage path is formed, and the potential of the first node P1 is gradually decreased. Then, the potential of the first node P1 may be shaped into a square wave signal after passing through two inverters F1 formed of two first inverting transistors F11 and two second inverting transistors F12. Before the potential of the first node P1 is not pulled down, the potential of the second node P2 may be the potential of the second power supply signal; after the potential of the first node P1 is pulled down to a certain value (which may be determined based on simulation and is related to the first potential), the potential of the second node P2 may become the first potential. At this time, the first light-emission control transistor M2 may be turned on. Then, the reference signal at the second potential provided by the reference signal terminal Vref may be output to the third node P3 through the first light-emission control transistor M2 and the second light-emission control transistor M3, so that the driving transistor T6 stops outputting the driving signal. Accordingly, the light-emitting element L1 stops emitting light until the scanning of the current frame ends. In this way, the light-emitting duration of the light-emitting element L1 is controlled.

Figure 10:
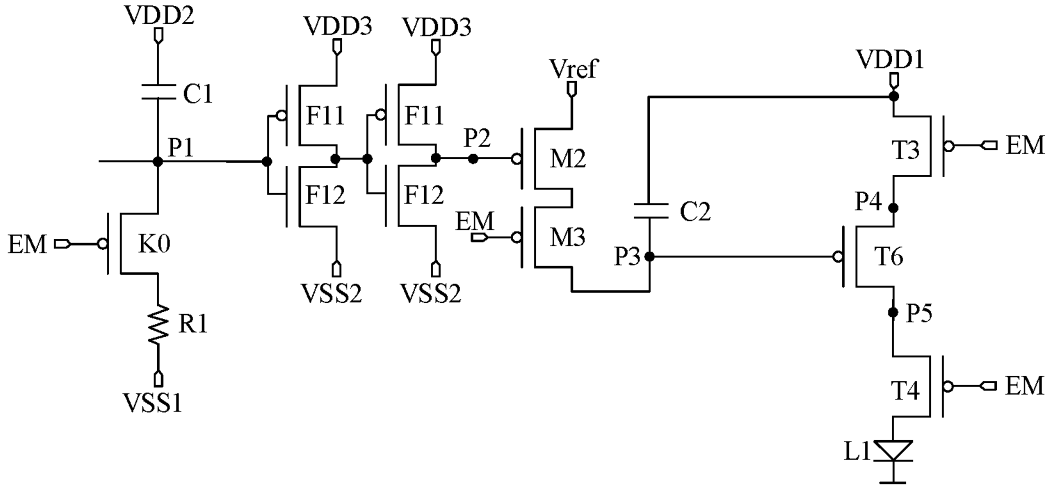
FIG. 10 is an equivalent circuit diagram of a pixel circuit in a light-emitting stage according to an embodiment of the present disclosure.

For example, FIG. 10 shows a relationship between the light-emitting duration and the potential of the second data signal provided by the second data signal terminal DI by taking two second data signals of different magnitudes as an example. The horizontal axis may represent time t00, and the vertical axis may represent the potential (unit: voltage). Referring to FIG. 10, it can be known that the higher the potential (such as VdataT1) of the second data signal is, the longer the time required for the potential of the first node P1 to drop to the potential V1 turning on the first light-emission control transistor M2 is; and the lower the potential (such as VdataT2) of the second data signal is, the shorter the time required for the potential of the first node P1 to drop to the potential V1 turning on the first light-emission control transistor M2 is.

Accordingly, FIG. 10 further shows the potential waveform of the second node P2 and the emission time corresponding to the light-emitting element L1. The light-emitting duration (emission time1) t01 corresponding to the second data signal with the higher potential VdataT1 is shorter than the light-emitting duration (emission time2) t02 corresponding to the second data signal with the lower potential VdataT2. Since the luminance of the light-emitting element L1 has a linear relationship with the light-emitting duration in the display stage of each frame, the luminance of the light-emitting element L1 is different under different light-emitting durations. That is, by controlling the light-emitting duration, the grayscale may be also adjusted flexibly. The display uniformity can be further effectively ensured by controlling the driving current and light-emitting duration.

Figure 11:
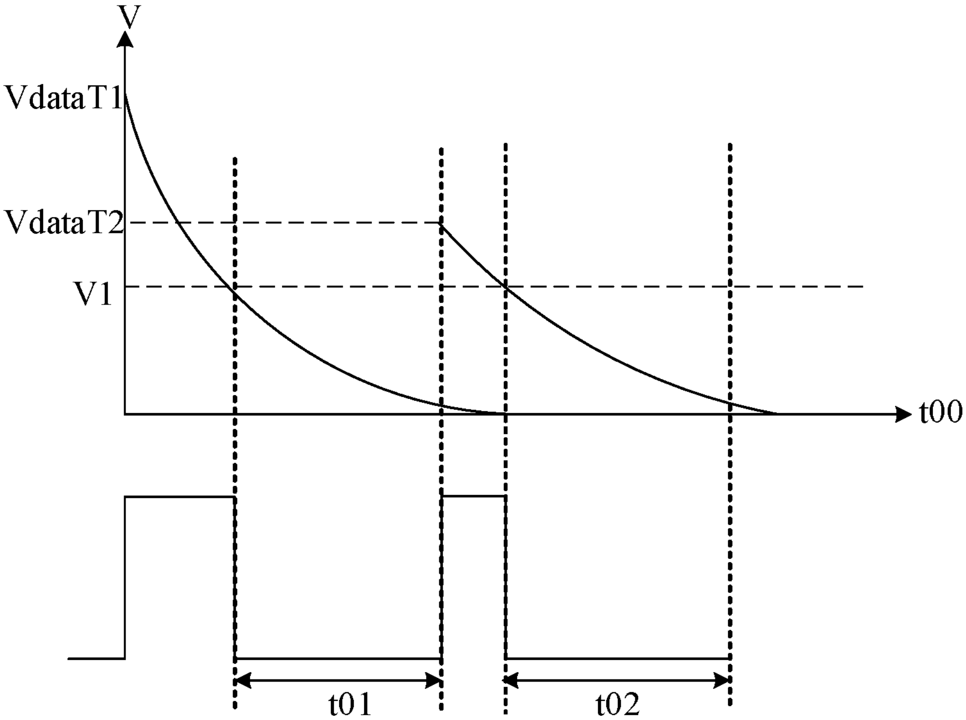
FIG. 11 is a schematic diagram of a relationship between a light-emitting duration and a potential of a data signal according to an embodiment of the present disclosure.

In addition, referring to FIG. 7, in the light-emitting stage 13, the potential of the gate driving signal provided by the gate signal terminal G1 and the potential of the light-emission control signal provided by the light-emission control signal terminal EM are the second potential, and transistors, other than transistors that are turned on in the above light-emitting stage t3, are all turned off. For the equivalent circuit diagram of the pixel circuit in the light-emitting stage 13, reference may be made to FIG. 11 (the dotted line in the figure indicates non-conduction).

In summary, the embodiment of the present disclosure provides a method for driving a pixel circuit. The light-emission adjusting circuit can adjust the data signal written by the data writing circuit to the first node and can adjust the potential of the second node based on the potential of the first node; and the light-emission control circuit can output the reference signal to the third node under control of the potential of the second node. Furthermore, the light-emission driving circuit needs to output, in response to the potential of the third node, the driving signal to the light-emitting element, to drive the light-emitting element to emit light. Therefore, when the pixel circuit is driven, the potentials of respective signals can be flexibly set to control the moment of outputting the reference signal to the third node, so as to control the time length of outputting the driving signal by the light-emission driving circuit, thereby controlling the light-emitting duration of the light-emitting element. In this way, the light-emitting element can work under a high current density with better uniformity, which ensures a better display effect.

Figure 12:
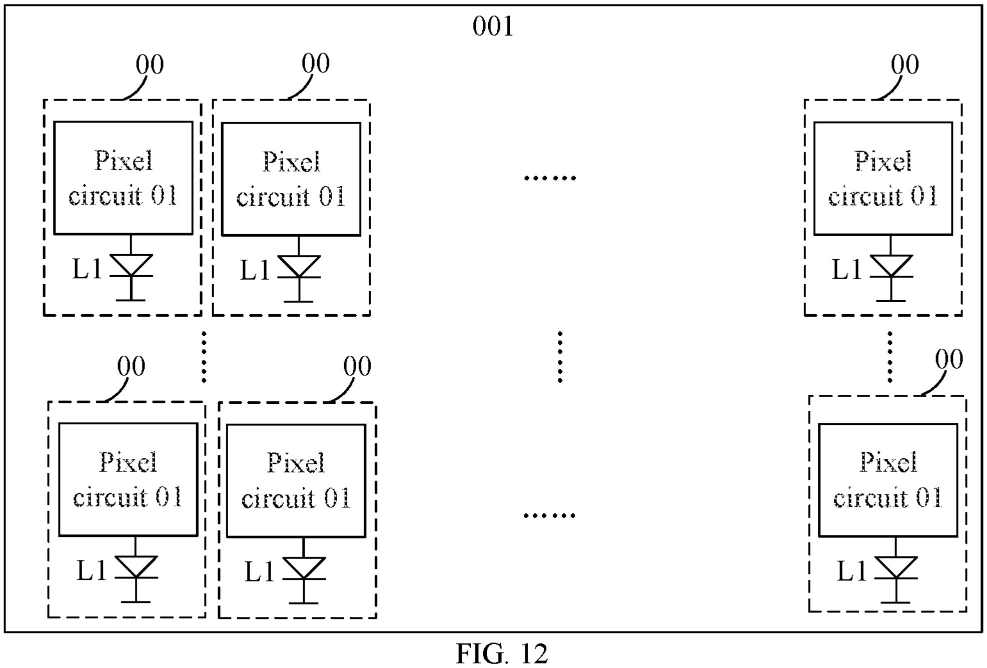
FIG. 12 is a schematic structural diagram of a display substrate according to an embodiment of the present disclosure.

Optionally, FIG. 12 is a schematic structural diagram of a display substrate according to an embodiment of the present disclosure. As shown in FIG. 12, the display substrate 001 may include: a plurality of pixel units 00. In the plurality of pixel units 00, at least one pixel unit 00 may include a light-emitting element L1 and the pixel circuit 01 as shown in any one of FIG. 1 to FIG. 5. For example, each pixel unit 00 in the display substrate 001 shown in FIG. 12 includes the pixel circuit 01 as shown in any one of FIG. 1 to FIG. 5. Optionally, the light-emitting element may be a micro LED.

Figure 13:
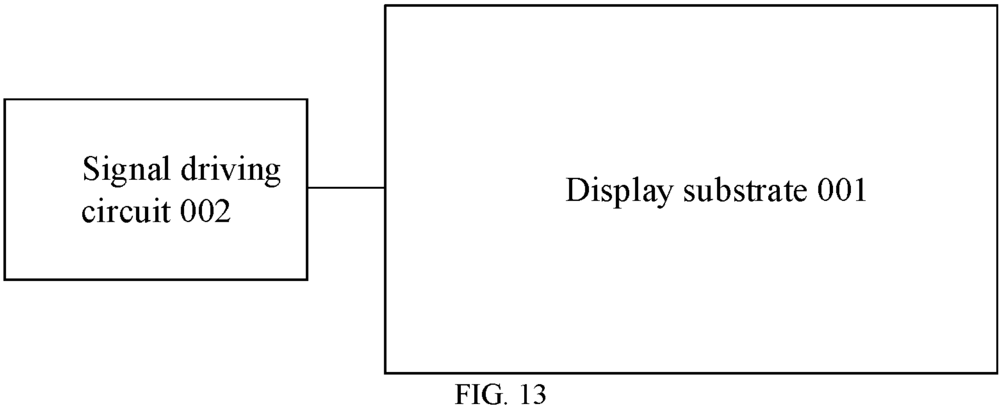
FIG. 13 is a schematic structural diagram of a display apparatus according to an embodiment of the present disclosure.

FIG. 13 is a schematic structural diagram of a display apparatus according to an embodiment of the present disclosure. As shown in FIG. 13, the display apparatus may include: a signal driving circuit 002, and the display substrate 001 as shown in FIG. 12.

The signal driving circuit 002 may be coupled to the signal terminals in the pixel circuit 01 in the display substrate 001, and the signal driving circuit 002 may be configured to provide signals for the signal terminals.

For example, the signal driving circuit 002 may include a first gate driving circuit, a second gate driving circuit and a source driving circuit. The first gate driving circuit may be connected to the gate signal terminal G1 in the pixel circuit 01, to provide a gate signal to the gate signal terminal G1. The second gate driving circuit may be connected to the light-emission control signal terminal EM in the pixel circuit 01, to provide a light-emission control signal to the light-emission control signal terminal EM. The source driving circuit may be connected to the first data signal terminal DT and the second data signal terminal DI in the pixel circuit 01, to provide data signals to the first data signal terminal DT and the second data signal terminal DI.

Optionally, the first gate driving circuit may be connected to the gate signal terminal G1 through a gate line, the second gate driving circuit may be connected to the light-emission control signal terminal EM through a light-emitting control line, and the source driving circuit may be connected to the data signal terminals DI and DT through data signal lines. In addition, the gate signal terminals G1 in the pixel circuits 01 in the same row may be connected to the same gate line, and the gate signal terminals G1 in the pixel circuits 01 in different rows may be connected to different gate lines. The light-emission control signal terminals EM in the pixel circuits 01 in the same row may be connected to the same light-emitting control line, and the light-emission control signal terminals EM in the pixel circuits 01 in different rows may be connected to different light-emitting control lines. The first data signal terminals DT in the pixel circuits 01 in the same column may be connected to the same first data line, and the first data signal terminals DT in the pixel circuits 01 in different columns may be connected to different first data lines. The second data signal terminals DI in the pixel circuits in the same column may be connected to the same second data line, and the second data signal terminals DI in the pixel circuits 01 in different columns may be connected to different second data lines.

In the case of scanning line by line, during normal working, the first gate driving circuit may sequentially output gate driving signals at the first potential to the gate signal terminals G1 connected to the pixel circuits in respective rows through respective gate lines, and the second gate driving circuit may sequentially output light-emission control signals at the first potential to the light-emission control signal terminals EM connected to the pixel circuits in respective rows through respective light-emitting control lines. In addition, the source driving circuit may output the first data signals at different potentials to the same first data line at different moments, that is, the source driving circuit may output the first data signals at different potentials to the respective first data signal terminals DT in the pixel circuits in the same column and different rows through the same first data line; and the same is true for the second data signal terminals DI, which is not repeated in detail here.

For example, the same first data line connected to the first data signal terminal DT in the pixel circuit in the first row and the first column and connected to the first data signal terminal DT in the pixel circuit in the second row and the first column is a first data line. Assuming that in the data writing stage when the pixel circuits in the first row are driven, the potential of the first data signal provided by the source driving circuit to the pixel circuit 01 in the first row and the first column through the first data line is VdataT1, and in the data writing stage when the pixel circuits in the second row are driven, the potential of the first data signal provided by the source driving circuit to the pixel circuit in the second row and the first column through the first data line is VdataT2, then VdataT1 and VdataT2 may be the same or different.

Optionally, the display apparatus may be any product or component with a display function, such as a micro LED display apparatus, a liquid crystal panel, electronic paper, a mobile phone, a tablet computer, a television, a display, and a notebook computer.

Those skilled in the art may clearly understand that, for the convenience and conciseness of descriptions, for the specific working processes of the pixel circuit, the display substrate and the display apparatus described above, reference may be made to the corresponding processes in the above method embodiments, and details are not repeated here.

The descriptions above are merely optional embodiments of the present disclosure, and are not intended to limit the present disclosure. Within the spirit and principles of the disclosure, any modifications, equivalent substitutions, improvements, and the like are within the protection scope of the present disclosure.

What is claimed is:

1. A pixel circuit, comprising: a data writing circuit, a light-emission adjusting circuit, a light-emission control circuit, and a light-emission driving circuit; wherein the data writing circuit is coupled to a gate signal terminal, a first data signal terminal and a first node, and the data writing circuit is configured to output a first data signal provided by the first data signal terminal to the first node in response to a gate driving signal provided by the gate signal terminal;

the light-emission adjusting circuit is coupled to a target signal terminal, the first node and a second node, and the light-emission adjusting circuit is configured to store a potential of the first node, adjust the potential of the first node in response to a target signal provided by the target signal terminal, and adjust a potential of the second node based on the potential of the first node;

the light-emission control circuit is coupled to the second node, a reference signal terminal, a light-emission control signal terminal and a third node, and the light-emission control circuit is configured to output a reference signal provided by the reference signal terminal to the third node in response to the potential of the second node and a light-emission control signal provided by the light-emission control signal terminal; and the light-emission driving circuit is coupled to the third node, the gate signal terminal, a first power supply terminal, a second data signal terminal and a light-emitting element, and the light-emission driving circuit is configured to output a driving signal to the light-emitting element in response to the gate driving signal, a potential of the third node, a first power supply signal provided by the first power supply terminal and a second data signal provided by the second data signal terminal, wherein the light-emission adjusting circuit comprises: a first storage sub-circuit, an adjusting sub-circuit and a shaping sub-circuit; wherein the first storage sub-circuit is coupled to a second power supply terminal and the first node, and the first storage sub-circuit is configured to store the potential of the first node under control of a second power supply signal provided by the second power supply terminal;

the adjusting sub-circuit is coupled to the target signal terminal, the first node and a third power supply terminal, and the adjusting sub-circuit is configured to adjust the potential of the first node in response to the target signal and a third power supply signal provided by the third power supply terminal; and the shaping sub-circuit is coupled to the first node and the second node, and the shaping sub-circuit is configured to adjust the potential of the second node based on the potential of the first node.

2. The pixel circuit according to claim 1, wherein the target signal terminal is the light-emission control signal terminal; and the adjusting sub-circuit comprises a switching transistor and a resistor; wherein a gate of the switching transistor is coupled to the light-emission control signal terminal, a first electrode of the switching transistor is coupled to the first node, and a second electrode of the switching transistor is coupled to one end of the resistor; and the other end of the resistor is coupled to the third power supply terminal.

3. The pixel circuit according to claim 1, wherein the target signal terminal is a power supply signal terminal, a potential of a power supply signal provided by the power supply signal terminal being adjustable; and the adjusting sub-circuit comprises a control transistor;

wherein a gate of the control transistor is coupled to the power supply signal terminal, a first electrode of the control transistor is coupled to the first node, and a second electrode of the control transistor is coupled to the third power supply terminal.

4. The pixel circuit according to claim 1, wherein the shaping sub-circuit comprises:

one inverter coupled between the first node and the second node; or a plurality of inverters connected in series between the first node and the second node.

5. The pixel circuit according to claim 4, wherein each inverter comprises: a first inverting transistor and a second inverting transistor; wherein a gate of the first inverting transistor and a gate of the second inverting transistor are coupled and are both configured to be coupled to the first node;

a second electrode of the first inverting transistor and a second electrode of the second inverting transistor are coupled and are both configured to be coupled to the second node; and a first electrode of the first inverting transistor is coupled to a fourth power supply terminal, and a first electrode of the second inverting transistor is coupled to a fifth power supply terminal.

6. The pixel circuit according to claim 4, wherein the shaping sub-circuit comprises: two inverters connected in series between the first node and the second node.

7. The pixel circuit according to claim 1, wherein the first storage sub-circuit comprises: a storage capacitor;

wherein one end of the storage capacitor is coupled to the second power supply terminal, and the other end of the storage capacitor is coupled to the first node.

8. The pixel circuit according to claim 1, wherein the data writing circuit comprises: a data writing transistor; the light-emission control circuit comprises: a first light-emission control transistor and a second light-emission control transistor; wherein a gate of the data writing transistor is coupled to the gate signal terminal, a first electrode of the data writing transistor is coupled to the first data signal terminal, and a second electrode of the data writing transistor is coupled to the first node;

a gate of the first light-emission control transistor is coupled to the second node, a first electrode of the first light-emission control transistor is coupled to the reference signal terminal, and a second electrode of the first light-emission control transistor is coupled to a first electrode of the second light-emission control transistor; and a gate of the second light-emission control transistor is coupled to the light-emission control signal terminal, and a second electrode of the second light-emission control transistor is coupled to the third node.

9. The pixel circuit according to claim 1, wherein the light-emission driving circuit comprises: a data writing sub-circuit, a reset sub-circuit, a second storage sub-circuit, a light-emission control sub-circuit, a compensation sub-circuit and a driving sub-circuit; wherein the data writing sub-circuit is coupled to the gate signal terminal, the second data signal terminal and a fourth node, and the data writing sub-circuit is configured to output the second data signal to the fourth node in response to the gate driving signal;

the reset sub-circuit is coupled to a reset signal terminal, an initial signal terminal and the third node, and the reset sub-circuit is configured to output an initial signal provided by the initial signal terminal to the third node in response to a reset signal provided by the reset signal terminal;

the second storage sub-circuit is coupled to the third node and the first power supply terminal, and the second storage sub-circuit is configured to control the potential of the third node under control of the first power supply signal;

the light-emission control sub-circuit is coupled to the light-emission control signal terminal, the first power supply terminal, the fourth node, a fifth node and the light-emitting element, and the light-emission control sub-circuit is configured to output the first power supply signal to the fourth node and control conduction/non-conduction between the fifth node and the light-emitting element, in response to the light-emission control signal;

the compensation sub-circuit is coupled to the gate signal terminal, the third node and the fifth node, and the compensation sub-circuit is configured to adjust the potential of the third node based on a potential of the fifth node in response to the gate driving signal; and the driving sub-circuit is coupled to the third node, the fourth node and the fifth node, and the driving sub-circuit is configured to output a driving signal to the fifth node in response to the potential of the third node and a potential of the fourth node.

10. The pixel circuit according to claim 5, wherein the shaping sub-circuit comprises: two of the inverters connected in series between the first node and the second node;

the first storage sub-circuit comprises: a storage capacitor, wherein one end of the storage capacitor is coupled to the second power supply terminal, and the other end of the storage capacitor is coupled to the first node;

the data writing circuit comprises: a data writing transistor; the light-emission control circuit comprises: a first light-emission control transistor and a second light-emission control transistor; wherein a gate of the data writing transistor is coupled to the gate signal terminal, a first electrode of the data writing transistor is coupled to the first data signal terminal, and a second electrode of the data writing transistor is coupled to the first node; a gate of the first light-emission control transistor is coupled to the second node, a first electrode of the first light-emission control transistor is coupled to the reference signal terminal, and a second electrode of the first light-emission control transistor is coupled to a first electrode of the second light-emission control transistor; and a gate of the second light-emission control transistor is coupled to the light-emission control signal terminal, and a second electrode of the second light-emission control transistor is coupled to the third node;

the light-emission driving circuit comprises: a data writing sub-circuit, a reset sub-circuit, a second storage sub-circuit, a light-emission control sub-circuit, a compensation sub-circuit and a driving sub-circuit; wherein the data writing sub-circuit is coupled to the gate signal terminal, the second data signal terminal and the fourth node, and the data writing sub-circuit is configured to output the second data signal to the fourth node in response to the gate driving signal; the reset sub-circuit is coupled to a reset signal terminal, an initial signal terminal and the third node, and the reset sub-circuit is configured to output an initial signal provided by the initial signal terminal to the third node in response to a reset signal provided by the reset signal terminal; the second storage sub-circuit is coupled to the third node and the first power supply terminal, and the second storage sub-circuit is configured to control the potential of the third node under control of the first power supply signal; the light-emission control sub-circuit is coupled to the light-emission control signal terminal, the first power supply terminal, the fourth node, a fifth node and the light-emitting element, and the light-emission control sub-circuit is configured to output the first power supply signal to the fourth node and control conduction/non-conduction between the fifth node and the light-emitting element, in response to the light-emission control signal; the compensation sub-circuit is coupled to the gate signal terminal, the third node and the fifth node, and the compensation sub-circuit is configured to adjust the potential of the third node based on a potential of the fifth node in response to the gate driving signal; and the driving sub-circuit is coupled to the third node, the fourth node and the fifth node, and the driving sub-circuit is configured to output a driving signal to the fifth node in response to the potential of the third node and a potential of the fourth node; and the target signal terminal is the light-emission control signal terminal; and the adjusting sub-circuit comprises: a switching transistor and a resistor; wherein a gate of the switching transistor is coupled to the light-emission control signal terminal, a first electrode of the switching transistor is coupled to the first node, and a second electrode of the switching transistor is coupled to one end of the resistor; and the other end of the resistor is coupled to the third power supply terminal; or the target signal terminal is a power supply signal terminal, a potential of a power supply signal provided by the power supply signal terminal being adjustable; and the adjusting sub-circuit comprises: a control transistor, wherein a gate of the control transistor is coupled to the power supply signal terminal, a first electrode of the control transistor is coupled to the first node, and a second electrode of the control transistor is coupled to the third power supply terminal.

11. A method for driving a pixel circuit, wherein the pixel circuit comprises: a data writing circuit, a light-emission adjusting circuit, a light-emission control circuit, and a light-emission driving circuit, wherein the data writing circuit is coupled to a gate signal terminal, a first data signal terminal and a first node; the light-emission adjusting circuit is coupled to a target signal terminal, the first node and a second node; the light-emission control circuit is coupled to the second node, a reference signal terminal, a light-emission control signal terminal and a third node; and the light-emission driving circuit is coupled to the third node, the gate signal terminal, a first power supply terminal, a second data signal terminal and a light-emitting element;

the method comprising:

in a data writing stage, outputting, by the data writing circuit, a first data signal provided by the first data signal terminal to the first node in response to a gate driving signal provided by the gate signal terminal, and storing, by the light-emission adjusting circuit, a potential of the first node, wherein a potential of the gate driving signal is a first potential; and in a light-emitting stage, adjusting, by the light-emission adjusting circuit, the potential of the first node in response to a target signal provided by the target signal terminal and adjusting, by the light-emission adjusting circuit, a potential of the second node based on the potential of the first node; and outputting, by the light-emission control circuit, a reference signal provided by the reference signal terminal to the third node in response to the potential of the second node and a light-emission control signal provided by the light-emission control signal terminal, a potential of the reference signal being a second potential; and outputting, by the light-emission driving circuit, a driving signal to the light-emitting element in response to a potential of the third node, the first data signal and a first power supply signal provided by the first power supply terminal, wherein a potential of the target signal and a potential of the light-emission control signal are both the first potential, wherein the light-emission adjusting circuit comprises: a first storage sub-circuit, an adjusting sub-circuit and a shaping sub-circuit; wherein the first storage sub-circuit is coupled to a second power supply terminal and the first node, and the first storage sub-circuit is configured to store the potential of the first node under control of a second power supply signal provided by the second power supply terminal;

the adjusting sub-circuit is coupled to the target signal terminal, the first node and a third power supply terminal, and the adjusting sub-circuit is configured to adjust the potential of the first node in response to the target signal and a third power supply signal provided by the third power supply terminal; and the shaping sub-circuit is coupled to the first node and the second node, and the shaping sub-circuit is configured to adjust the potential of the second node based on the potential of the first node.

12. A display substrate, comprising a plurality of pixel units, wherein at least one of the pixel units comprises: a light-emitting element, and the pixel circuit, wherein the pixel circuit is coupled to the light-emitting element, and comprises: a data writing circuit, a light-emission adjusting circuit, a light-emission control circuit, and a light-emission driving circuit; wherein the data writing circuit is coupled to a gate signal terminal, a first data signal terminal and a first node, and the data writing circuit is configured to output a first data signal provided by the first data signal terminal to the first node in response to a gate driving signal provided by the gate signal terminal;

the light-emission adjusting circuit is coupled to a target signal terminal, the first node and a second node, and the light-emission adjusting circuit is configured to store a potential of the first node, adjust the potential of the first node in response to a target signal provided by the target signal terminal, and adjust a potential of the second node based on the potential of the first node;

the light-emission control circuit is coupled to the second node, a reference signal terminal, a light-emission control signal terminal and a third node, and the light-emission control circuit is configured to output a reference signal provided by the reference signal terminal to the third node in response to the potential of the second node and a light-emission control signal provided by the light-emission control signal terminal; and the light-emission driving circuit is coupled to the third node, the gate signal terminal, a first power supply terminal, a second data signal terminal and a light-emitting element, and the light-emission driving circuit is configured to output a driving signal to the light-emitting element in response to the gate driving signal, a potential of the third node, a first power supply signal provided by the first power supply terminal and a second data signal provided by the second data signal terminal, wherein the light-emission adjusting circuit comprises: a first storage sub-circuit, an adjusting sub-circuit and a shaping sub-circuit; wherein the first storage sub-circuit is coupled to a second power supply terminal and the first node, and the first storage sub-circuit is configured to store the potential of the first node under control of a second power supply signal provided by the second power supply terminal;

the adjusting sub-circuit is coupled to the target signal terminal, the first node and a third power supply terminal, and the adjusting sub-circuit is configured to adjust the potential of the first node in response to the target signal and a third power supply signal provided by the third power supply terminal; and the shaping sub-circuit is coupled to the first node and the second node, and the shaping sub-circuit is configured to adjust the potential of the second node based on the potential of the first node.

13. The display substrate according to claim 12, wherein the light-emitting element is a micro light-emitting diode.

14. A display apparatus, comprising: a signal driving circuit, and the display substrate according to claim 13, wherein the signal driving circuit is coupled to signal terminals in the pixel circuit in the display substrate, and the signal driving circuit is configured to provide signals to the signal terminals.

15. The display substrate according to claim 12, wherein the light-emission adjusting circuit comprises: a first storage sub-circuit, an adjusting sub-circuit and a shaping sub-circuit; wherein the first storage sub-circuit is coupled to a second power supply terminal and the first node, and the first storage sub-circuit is configured to store the potential of the first node under control of a second power supply signal provided by the second power supply terminal;

the adjusting sub-circuit is coupled to the target signal terminal, the first node and a third power supply terminal, and the adjusting sub-circuit is configured to adjust the potential of the first node in response to the target signal and a third power supply signal provided by the third power supply terminal; and the shaping sub-circuit is coupled to the first node and the second node, and the shaping sub-circuit is configured to adjust the potential of the second node based on the potential of the first node.

16. The display substrate according to claim 15, wherein the target signal terminal is the light-emission control signal terminal; and the adjusting sub-circuit comprises a switching transistor and a resistor; wherein a gate of the switching transistor is coupled to the light-emission control signal terminal, a first electrode of the switching transistor is coupled to the first node, and a second electrode of the switching transistor is coupled to one end of the resistor; and the other end of the resistor is coupled to the third power supply terminal.

17. The display substrate according to claim 15, wherein the target signal terminal is a power supply signal terminal, a potential of a power supply signal provided by the power supply signal terminal being adjustable; and the adjusting sub-circuit comprises a control transistor;

wherein a gate of the control transistor is coupled to the power supply signal terminal, a first electrode of the control transistor is coupled to the first node, and a second electrode of the control transistor is coupled to the third power supply terminal.

18. The display substrate according to claim 15, wherein the shaping sub-circuit comprises:

one inverter coupled between the first node and the second node; or a plurality of inverters connected in series between the first node and the second node.

19. The display substrate according to claim 18, wherein each inverter comprises: a first inverting transistor and a second inverting transistor; wherein a gate of the first inverting transistor and a gate of the second inverting transistor are coupled and are both configured to be coupled to the first node;

a second electrode of the first inverting transistor and a second electrode of the second inverting transistor are coupled and are both configured to be coupled to the second node; and a first electrode of the first inverting transistor is coupled to a fourth power supply terminal, and a first electrode of the second inverting transistor is coupled to a fifth power supply terminal.

* * * * *